Patented June 26, 1934

1,963,999

UNITED STATES PATENT OFFICE 1,963,999

PROCESS FOR PRODUCING POLYHYDROXY ALCOHOLS

Arthur Whitney Larchar, Wilmington, Del., assignor to E. I. du Pont de Nemours & Company, Wilmington, Del., a corporation of Delaware No Drawing. Application May 12, 1930, Serial No. 451,870

16 Claims. (Cl. 260—156.5)

This invention relates to the art of producing alcohols and more particularly to the catalytic hydrogenation of sugars to form polyhydroxy alcohols.

This invention has as an object to provide a process for producing polyhydroxy alcohols from sugars. A further object is to provide a process for the catalytic reduction of hexoses and pentoses to polyhydroxy alcohols of the same number of carbon atoms as the sugar treated. A still further object is to provide a process for the catalytic hydrogenation of a polysaccharide to form a plurality of polyhydroxy alcohols, each containing a less number of carbon atoms than the polysaccharide treated. Another object is to provide a process for the catalytic hydrogenation of a disaccharide to form an alcohol or alcohols having half the number of carbon atoms as the original sugar. It is a specific object to hydrogenate dextrose to sorbitol in the presence of an efficient hydrogenating metal catalyst. Other objects will appear hereinafter.

These objects are accomplished by the following invention which comprises subjecting neutral non-alcoholic solutions of sugars, such as pentoses, hexoses, and certain of the polysaccharides, including disaccharides, to the action of hydrogen at elevated temperatures and pressures, in the presence of a supported, reduced, metal catalyst having a hydrogenating effect, whereupon hydrogen is added to the aldehyde or ketone group of the sugar to form the hydroxy radical and thereby convert the sugar to an alcohol.

The following examples of my invention are included merely for purposes of illustration, but are not to be regarded as limitations.

*Example 1.*—100 grams of galactose, obtained by the hydrolysis of galactan, were dissolved in 200 cc. of water and charged into a pressure container with 10 grams of a reduced nickel catalyst. The catalyst was prepared by precipitation of nickel carbonate on kieselguhr followed by reduction in hydrogen. Hydrogen was introduced into the container until a pressure of about 1000 pounds was built up. The vessel was then agitated vigorously for two hours, during which period the temperature was maintained at 150° C. and hydrogen added periodically to replenish that used in reduction of the sugar and to continuously maintain the pressure at approximately 1000 pounds. The product was filtered hot and the filtrate concentrated on a steam bath until fine white crystals of dulcitol began to separate. 63 grams of the alcohol were obtained on cooling and filtering, and further concentration of the mother liquor yielded a second crop of 24 grams of the crystalline alcohol. The crystalline material was found to have a melting point of 186° C.

*Example 2.*—50 grams of 1-xylose dissolved in 200 cc. of water were shaken with 10 grams of the nickel catalyst prepared as in Example 1, but supported on silica gel, under a constant hydrogen pressure of from 1400 to 1600 pounds. The temperature was held at 140° to 150° C. and the hydrogen absorption ceased after 30 minutes. After one hour the solution was found to be free from reducing sugars as tested with Fehling's solution and a yield of between 99% and 100% of xylitol in the form of a viscous non-crystalline syrup was obtained by filtration and concentration.

*Example 3.*—A solution of 200 grams of lactose in an equal weight of water was agitated with 15 grams of reduced nickel on kieselguhr under 900 pounds hydrogen pressure. Hydrogen absorption started rapidly at 110° to 120° C. and the vessel was held at 150° C. for one and three-quarter hours, at the end of which time the product was found to be free from reducing sugars. The liquid removed from the tube in which the reaction was carried out was filtered and concentrated until crystals of dulcitol began to form. On cooling and filtering 50 grams of the alcohol were obtained, while the mother liquor on further concentration and on standing congealed to a horny mass consisting of a mixture of dulcitol and sorbitol.

*Example 4.*—200 grams of crystalline sucrose and 200 cc. of water were shaken briskly with 10 grams of reduced nickel on kieselguhr under a hydrogen pressure of 1600 pounds and at a temperature of 140° to 150° C. Hydrogen was readily absorbed and the run was continued for four hours. The resulting material was filtered, evaporated to constant weight on a steam bath and found to consist of a mixture of mannitol and sorbitol.

*Example 5.*—100 grams of commercial dextrose, 200 cc. of water, and 10 grams of a catalyst containing approximately 20% of reduced nickel prepared by precipitating nickel carbonate on kieselguhr, were vigorously agitated under a hydrogen pressure of 1500 pounds. Absorption of hydrogen began at 125° to 130° C. and the temperature was maintained at 150° C. for one and one-quarter hours. The product after filtration gave no test for reducing sugars with Fehling's solution. It was thereupon evaporated to a thick, transparent syrup on a steam bath. After standing several hours, this congealed to a tough, horny mass which was identified as sorbitol by the preparation of the dibenzal derivative.

*Example 6.*—A solution comprising 200 grams of dextrose in 200 cc. of water was shaken for a period of two hours in a suitable reaction tube with 15 grams of a nickel-chromium oxide catalyst prepared by the partial reduction of nickel chromate in the presence of hydrogen and containing 30% of reduced nickel. The temperature was maintained at 130 to 150° C. and the hydrogen pressure at 1000 pounds. The product was separated from the catalytic material by filtration and the filtrate evaporated. 190 grams of dextrose-free sorbitol were thereby obtained.

*Example 7.*—100 grams of dextrose, dissolved in 200 grams of water, were agitated with 20 grams of a copper-zinc catalyst, prepared by the reduction of the mixed hydroxides of the metals supported on silica gel. The temperature was maintained at 130 to 150° C. and the hydrogen pressure at 1400 pounds. The run was continued for two hours. Sorbitol containing negligible amounts of dextrose was obtained by filtration and evaporation of the reduced solution.

The results to be obtained by the use of my process are largely influenced by the degree of effectiveness with which the catalyst, the sugar solution, and the hydrogen gas are brought into contact with one another. Proper agitation may be effected by internal stirring as in an autoclave, or the entire vessel may be agitated by external means. In fact, any method whereby the gas, liquid, and catalyst are brought into intimate contact will expedite the reaction.

Owing to the ease with which sugar solutions are scorched, with attendant discoloration and caramel formation, it is important to restrict the heating period to a minimum. Therefore I prefer to employ every means of hastening the reduction, except the use of an unnecessarily high temperature. I prefer to operate under such conditions that the major part of the reduction will be completed in one-half to one hour, in order to avoid charring, but I may continue the reaction for several hours after the initial rapid hydrogenation of most of the sugar, if it is desired to carry the reduction to full completion. The actual concentration of unconverted sugar, if any, is then sufficiently low to obviate the probability of burning.

I can carry out the catalytic reduction of sugars at temperatures as low as 110° C., but prefer a temperature between 125 and 150° C., because of the fact that temperatures much in excess of the higher figure are usually accompanied by charring of the product and because temperatures below 125° C. give low reduction rates.

The relatively large proportions of catalyst disclosed in the above examples are employed merely to cut the reaction time to as short a period as possible, but it is to be understood that much smaller amounts of catalytic material may be used in effectively carrying out the process of the invention. After removal of the catalyst from the product by filtration, it may be reused for several subsequent reductions.

Similarly, I have found that the use of moderately high pressures is advantageous because of the fact that they increase the rate of hydrogenation. I prefer to operate at pressures between 1000 and 1500 pounds per square inch, but can successfully employ pressures as low as 375 pounds. The upper limit of pressure is, of course, governed only by the strength of the reaction vessel.

In several of the above examples I have indicated the use of equal parts by weight of water and sugar, but the proportions disclosed are not essential to the success of my invention and may be varied within wide limits. Furthermore, it is not necessary that the sugar be entirely dissolved; in fact, sugars in concentrations as high as 70 parts by weight per 30 parts of water can be readily hydrogenated. However, I prefer to employ 30 to 50 parts of sugar to 50 parts of water. It will be apparent to those skilled in the art that there is less danger of burning the product when the sugar concentration is kept relatively low.

In carrying out the hydrogenation of sugars, I may use any of the well known hydrogenating metals. By the term hydrogenating metals I refer to those having the property of inducing the hydrogenation of organic compounds capable of hydrogenation and include in this classification such metals as nickel, iron, copper, zinc, cobalt, tin, cadmium, silver, platinum and palladium. For the purposes of my invention I prefer to use a reduced metal catalyst supported upon a material which is, of itself, substantially inactive catalytically, such as pumice, silica gel, carbon, kieselguhr, or fuller's earth. I have found that especially valuable hydrogenating catalysts may be prepared by precipitating a chromate, carbonate, or hydroxide of the metal upon kieselguhr, followed by reduction with hydrogen.

Unsupported catalysts prepared by reduction of the metals are easily sintered during the reduction step, with resultant loss in activity. Such catalysts are generally unsatisfactory for carrying out my invention and therefore I prefer to use catalysts prepared as indicated above.

An example of a catalyst suitable for use in carrying out the process of my invention may be prepared as follows: 10 grams of infusorial earth is treated with a solution of 300 grams of nickel nitrate ($Ni(NO_3)_2.6H_2O$) in about 150 cc. of water and the resulting moist mass added to a strong water solution of 287 grams of sodium carbonate ($Na_2CO_3.10H_2O$) to precipitate the nickel as carbonate. The product is well washed and dried and the nickel carbonate reduced by heating in a glass tube just below red heat in a current of pure dry hydrogen until no more water is formed. It may thereafter be cooled in a current of pure dry carbon dioxide.

It will be apparent that my invention possesses many advantages, one of the principal of which is that certain valuable polyhydroxy alcohols which are now available only at very high prices, may readily be made from relatively cheap raw materials, such as sorbitol from dextrose. The polyhydroxy alcohols thus obtained, as well as their derivatives, such as esters, ethers, and products of dehydration, have properties which make them valuable in the formulation of inks, cosmetics, softeners, and other materials. Furthermore, valuable explosive compounds may be readily obtained by the nitration of the various polyhydroxy alcohols produced in accordance with the principles of my invention.

It is obvious that my process has many other advantages. The carrying out of the process in a neutral solution obviates the use of alkali and non-volatile salts and also avoids enolization and the resulting complexity of the reduction products. A particularly important advantage is that by operating under such conditions the reduction is completed within a very short period and I am able to obtain a product which is free from reducing sugars and uncontaminated with caramel.

As many apparently and widely different embodiments of this invention may be made without departing from the spirit and scope thereof, it is to be understood that I do not limit myself to the specific embodiments thereof except as defined in the appended claims.

I claim:

1. The process of producing a polyhydroxy alcohol which comprises agitating a neutral non-alcoholic solution of a sugar under a hydrogen pressure of at least 20 atmospheres at a temperature of 100° to 150° C. in the presence of a supported reduced hydrogenating metal catalyst.

2. The process of claim 1 in which the sugar is one containing not more than 12 carbon atoms.

3. The process of converting a sugar of the monosaccharide type into a polyhydroxy alcohol of the same number of carbon atoms as the original sugar, which comprises agitating a neutral, non-alcoholic solution of said sugar under a hydrogen pressure of at least 20 atmospheres at a temperature of 100° to 150° C. in the presence of a supported reduced hydrogenating metal catalyst.

4. The process of claim 3 in which the monosaccharide is hexose.

5. The process of producing sorbitol which comprises vigorously agitating a neutral non-alcoholic aqueous solution of dextrose under a hydrogen pressure of about 1500 pounds at a temperature of 125° to 150° C. in the presence of a supported catalyst prepared by precipitation and reduction of nickel hydroxide on kieselguhr.

6. The process of converting a sugar of the polysaccharide type into a plurality of polyhydroxy alcohols each containing a less number of carbon atoms than the original sugar, which comprises agitating a neutral non-alcoholic solution of said sugar under a hydrogen pressure of at least 20 atmospheres at a temperature of 100° to 150° C. in the presence of a supported reduced nickel catalyst.

7. The process of converting a sugar of the disaccharide type into a polyhydroxy alcohol containing half the number of carbon atoms as the original sugar, which comprises agitating a neutral non-alcoholic solution of said sugar under a hydrogen pressure of at least 20 atmospheres at a temperature of 100° to 150° C. in the presence of a supported reduced nickel catalyst.

8. The process of producing a polyhydroxy alcohol which comprises agitating a neutral non-alcoholic aqueous solution of a sugar under a hydrogen pressure of at least 375 lbs./sq. in. and at a temperature of 125° to 150° C. in the presence of a supported nickel catalyst.

9. The process of producing a polyhydroxy alcohol which comprises agitating a neutral non-alcoholic aqueous solution of a sugar under a hydrogen pressure of at least 375 lbs./sq. in. and at a temperature of 125° to 150° C. in the presence of a hydrogenating metal catalyst supported on silica.

10. The process of producing a polyhydroxy alcohol which comprises agitating a neutral non-alcoholic solution of a sugar under a hydrogen pressure of at least 375 lbs./sq. in. and at a temperature of 125° to 150° C. in the presence of a hydrogenating metal catalyst supported on silica.

11. The process of producing a polyhydroxy alcohol which comprises reacting a sugar with hydrogen at a pressure in excess of 375 pounds per square inch and at a temperature of 110° to 150° C. in the presence of a catalyst containing chromium oxide and a hydrogenating metal.

12. The process of claim 11 in which the catalyst is prepared by partial reduction of a hydrogenating metal chromate.

13. The process of claim 11 in which the catalyst is prepared by partial reduction of nickel chromate.

14. The process described in claim 1 in which the catalyst is a copper-zinc catalyst.

15. The process of producing sorbitol which comprises reacting glucose with hydrogen at a pressure in excess of 375 pounds per square inch and at a temperature of 110° to 150° C. in the presence of a catalyst containing chromium oxide and a hydrogenating metal.

16. The process of producing sorbitol which comprises reacting glucose with hydrogen at a pressure in excess of 375 pounds per square inch and at a temperature of 110° to 150° C. in the presence of a catalyst containing chromium oxide and copper.

ARTHUR W. LARCHAR.

---

CERTIFICATE OF CORRECTION.

Patent No. 1,963,999.   June 26, 1934.

ARTHUR WHITNEY LARCHAR.

It is hereby certified that error appears in the printed specification of the above numbered patent requiring correction as follows: Page 2, line 116, for "10" read 100; and that the said Letters Patent should be read with this correction therein that the same may conform to the record of the case in the Patent Office.

Signed and sealed this 7th day of August, A D. 1934.

Leslie Frazer (Seal)   Acting Commissioner of Patents.

able to obtain a product which is free from reducing sugars and uncontaminated with caramel.

As many apparently and widely different embodiments of this invention may be made without departing from the spirit and scope thereof, it is to be understood that I do not limit myself to the specific embodiments thereof except as defined in the appended claims.

I claim:

1. The process of producing a polyhydroxy alcohol which comprises agitating a neutral non-alcoholic solution of a sugar under a hydrogen pressure of at least 20 atmospheres at a temperature of 100° to 150° C. in the presence of a supported reduced hydrogenating metal catalyst.

2. The process of claim 1 in which the sugar is one containing not more than 12 carbon atoms.

3. The process of converting a sugar of the monosaccharide type into a polyhydroxy alcohol of the same number of carbon atoms as the original sugar, which comprises agitating a neutral, non-alcoholic solution of said sugar under a hydrogen pressure of at least 20 atmospheres at a temperature of 100° to 150° C. in the presence of a supported reduced hydrogenating metal catalyst.

4. The process of claim 3 in which the monosaccharide is hexose.

5. The process of producing sorbitol which comprises vigorously agitating a neutral non-alcoholic aqueous solution of dextrose under a hydrogen pressure of about 1500 pounds at a temperature of 125° to 150° C. in the presence of a supported catalyst prepared by precipitation and reduction of nickel hydroxide on kieselguhr.

6. The process of converting a sugar of the polysaccharide type into a plurality of polyhydroxy alcohols each containing a less number of carbon atoms than the original sugar, which comprises agitating a neutral non-alcoholic solution of said sugar under a hydrogen pressure of at least 20 atmospheres at a temperature of 100° to 150° C. in the presence of a supported reduced nickel catalyst.

7. The process of converting a sugar of the disaccharide type into a polyhydroxy alcohol containing half the number of carbon atoms as the original sugar, which comprises agitating a neutral non-alcoholic solution of said sugar under a hydrogen pressure of at least 20 atmospheres at a temperature of 100° to 150° C. in the presence of a supported reduced nickel catalyst.

8. The process of producing a polyhydroxy alcohol which comprises agitating a neutral non-alcoholic aqueous solution of a sugar under a hydrogen pressure of at least 375 lbs./sq. in. and at a temperature of 125° to 150° C. in the presence of a supported nickel catalyst.

9. The process of producing a polyhydroxy alcohol which comprises agitating a neutral non-alcoholic aqueous solution of a sugar under a hydrogen pressure of at least 375 lbs./sq. in. and at a temperature of 125° to 150° C. in the presence of a hydrogenating metal catalyst supported on silica.

10. The process of producing a polyhydroxy alcohol which comprises agitating a neutral non-alcoholic solution of a sugar under a hydrogen pressure of at least 375 lbs./sq. in. and at a temperature of 125° to 150° C. in the presence of a hydrogenating metal catalyst supported on silica.

11. The process of producing a polyhydroxy alcohol which comprises reacting a sugar with hydrogen at a pressure in excess of 375 pounds per square inch and at a temperature of 110° to 150° C. in the presence of a catalyst containing chromium oxide and a hydrogenating metal.

12. The process of claim 11 in which the catalyst is prepared by partial reduction of a hydrogenating metal chromate.

13. The process of claim 11 in which the catalyst is prepared by partial reduction of nickel chromate.

14. The process described in claim 1 in which the catalyst is a copper-zinc catalyst.

15. The process of producing sorbitol which comprises reacting glucose with hydrogen at a pressure in excess of 375 pounds per square inch and at a temperature of 110° to 150° C. in the presence of a catalyst containing chromium oxide and a hydrogenating metal.

16. The process of producing sorbitol which comprises reacting glucose with hydrogen at a pressure in excess of 375 pounds per square inch and at a temperature of 110° to 150° C. in the presence of a catalyst containing chromium oxide and copper.

ARTHUR W. LARCHAR.

CERTIFICATE OF CORRECTION.

Patent No. 1,963,999.

June 26, 1934.

ARTHUR WHITNEY LARCHAR.

It is hereby certified that error appears in the printed specification of the above numbered patent requiring correction as follows: Page 2, line 116, for "10" read 100; and that the said Letters Patent should be read with this correction therein that the same may conform to the record of the case in the Patent Office.

Signed and sealed this 7th day of August, A D. 1934.

Leslie Frazer

Acting Commissioner of Patents.

(Seal)